United States Patent [19]

Razzano et al.

[11] 3,974,120

[45] Aug. 10, 1976

[54] FLUOROSILICONE COPOLYMERS AND PROCESS FOR THE PREPARATION THEREOF

[75] Inventors: John S. Razzano, Watervliet; Verne G. Simpson, Mechanicville, both of N.Y.

[73] Assignee: General Electric Company, Waterford, N.Y.

[22] Filed: May 5, 1975

[21] Appl. No.: 574,331

[52] U.S. Cl................... 260/30.4 SB; 260/30.6 SB; 260/30.8 R; 260/32.4; 260/46.5 R
[51] Int. Cl.².......................................... C08K 5/15
[58] Field of Search............... 260/30.4 SB, 30.6 SB, 260/30.8, 32.4

[56] References Cited
UNITED STATES PATENTS 3,483,270  12/1969  Bostick..................... 260/30.4 SB X

*Primary Examiner*—Lewis T. Jacobs
*Attorney, Agent, or Firm*—John L. Young; E. Philip Koltos; Edward A. Hedman

[57] ABSTRACT

Diorganopolysiloxane copolymers having a viscosity from 100,000 to 200,000,000 centipoise at 25°C., are produced by (a) forming an admixture of (i) a cyclic alkyl trifluoropropyl trisiloxane, (ii) a second cyclic diorgano trisiloxane, (i) being present in an amount of 40 to 85 mol % of the total of (i) and (ii), (iii) from 5 to 300 parts per million of an alkyl lithium catalyst, the alkyl component containing from 1 to 12 carbon atoms, and (iv) an aprotic solvent, said aprotic solvent being capable of dissolving both the trimers (i) and (ii) and the copolymer product, (b) reacting said admixture at a temperature between 0°C. and 150°C. to form the copolymer, and (c) recovering the copolymer from the reaction mixture.

8 Claims, No Drawings

3,974,120

FLUOROSILICONE COPOLYMERS AND PROCESS FOR THE PREPARATION THEREOF

FIELD OF THE INVENTION

The present invention relates to a process for producing fluorosilicone copolymers from mixtures of fluoroalkyl cyclotrisiloxanes and, more specifically, to the production of such copolymers from mixtures of (i) cyclic trisiloxanes wherein at least one of the organo groups attached to the silicon atom is trifluoropropyl with (ii) a second trisiloxane co-monomer.

There has previously been disclosed the preparation of copolymers of 3,3,3-trifluoropropylmethylsiloxy groups with, for example, dimethylsiloxy groups, but only in the composition range of "up to 10 mol % dimethylsiloxy groups", see, Johannson, U.S. Pat. No. 3,002,951. Such copolymers have a high resistance to swell in hydrocarbon solvents. Often, however, the full solvent resistance inherent in a 90 mol % trifluoropropylsiloxy - 10 mol % dimethylsiloxy copolymer is not required. In such instances, the only recourse to adjusting the solvent resistance to the less than full value was to blend the above copolymer with a polydimethylsiloxane. Generally, a copolymer of less than 90 mol % of trifluoropropylsiloxy groups should be more efficient in use of fluorosilicone groups than a blend of a 90 mol % fluorosilicone copolymer and a dimethylsiloxy polymer at the same fluorosilicone content. However, trifluoropropyl substituted tricyclic monomers do not readily copolymerize in the desired composition range. See Johannson and, also Bostick, U.S. Pat. No. 3,337,497, the latter disclosing that fluorine substitution on alkyl should be avoided in producing ordered copolymers from cyclic trisiloxanes.

Surprisingly, now, there has been discovered a polymerization technique which will permit the production of a high molecular weight fluorosilicone — diorgano siloxane copolymer, of fluorosilicone content in the range of 40 – 85 mol % trifluoropropylorganosiloxy groups. Moreover, the efficiency of the copolymer over the blend at the same fluorosilicone content, as regards resistance to swell in hydrocarbon solvents, has been demonstrated.

In essence, the present invention involves dissolving a fluorosilicone cyclic siloxane trimer and organosiloxane cyclic trimer in certain aprotic solvents, such as tetrahydrofuran, and polymerizing the solution with certain non-equilibrating catalysts such as organolithium in the temperature range of 0°C. to 150°C., limited by solution reflux temperatures, for times of 5 minutes to a number of hours. The choice of aprotic solvent is critical and the primary consideration is that both of the trimers and the resulting copolymers be soluble in the solvent. In addition, certain aprotic solvents, such as tetrahydrofuran, dimethylsulfoxide, tetramethylurea, hexamethyl phosphoric triamide, dioxane, and the like, have the ability to enhance the activity of catalysts such as butyl lithium, as is well known. This is fortunate, since certain preferred aprotic solvents, such as tetrahydrofuran, do not boil at high enough temperatures for butyl lithium to be effective if this promotion effect did not occur. The amount of aprotic solvent used in the polymerization of the cyclotrisiloxanes is determined primarily by the ratio of the cyclic trimers.

It is, accordingly, a principal object of the present invention to provide a process for producing trifluoropropyl organopolysiloxane copolymer gums or oils in high yield, using cyclic trimer starting materials and a solvent capable of dissolving both starting materials and final product.

Another object of the present invention is to provide trifluoropropyl organopolysiloxane copolymer oils and gums having a viscosity from 100,000 to 200,000,000 centipoise at 25°C., having enhanced resistance to swelling by hydrocarbon fluids, by a process comprising copolymerization of cyclic trisiloxanes in admixture with alkyl lithium catalysts and an aprotic solvent.

A further object of the present invention to provide trifluoroalkyl organopolysiloxane copolymer oils or gums having a viscosity from 100,000 to 200,000,000 centipoise at 25°C., wherein the fluoroalkylsiloxane co-monomer comprises 40 to 85 mol % of the copolymer units.

SUMMARY OF THE INVENTION

In accordance with the foregoing objects, the present invention provides a process for producing diorganopolysiloxane copolymers having a viscosity of from 100,000 to 200,000,000 centipoise at 25°C. comprising (a) forming an admixture of i. a cyclic polysiloxane of the formula, $(CF_3CH_2CH_2)(R)SiO_3$ wherein R is methyl, ethyl, vinyl or phenyl, ii. a second cyclic polysiloxane of the formula, $(R_2SiO)_3$ wherein R is, independently, as defined above, (i) being present in an amount of from 40 to 85 mol % of the total of (i) and (ii), (iii) is from 5 to 300 parts per million of an alkyl lithium catalyst, the alkyl component containing from 1 to 12 carbon atoms, and (iv) an aprotic solvent, said aprotic solvent being capable of dissolving both of the trimers (i) and (ii) and the copolymer product; (b) reacting said admixture at a temperature between 0°C. and 150°C. to form said copolymer; and (c) recovering said copolymer from the reaction mixture.

A preferred embodiment comprises recovering the product by stripping the solvent from the copolymer. It is preferred to deactivate the catalyst, e.g., by adding a drop of acetic acid prior to stripping. The stripping can be carried out at any conventional temperature, e.g., 50°C. to 200°C., at atmospheric pressure or under a vacuum of, e.g., 1 to 100 mm. of Hg, depending on the solvent.

The copolymerization reaction will usually require from 1/2 hour to 96 hours and, more usually, from 50 minutes to 10 hours. The cyclic trimer co-monomers (i) and (ii) are known in the art, see, e.g., the Johannson and Bostick patents cited above. The amount of co-monomer (i) in admixture with (ii) will vary between 40 and 85 mol %. Most preferably, however, (i) will comprise from 50 to 75 mol % of the total of (i) and (ii). Further, preferably, the R substituent radicals in the above formulae of the trisiloxanes is $CH_3$, i.e., methyl. The process provides diorganopolysiloxane copolymer oils or gums of from 30 to 200,000,000 centipoise viscosity at 25°C. depending on whether or not, for example, a conventional chain-stopper is employed.

DETAILED DESCRIPTION OF THE INVENTION

Obviously, the number of cyclotrisiloxanes (i) and (ii) which can be employed in the practice of the present invention can be varied widely. Among such cyclic trisiloxanes can be mentioned, for example, 2,4,6-trimethyl-2,4,6-tris(3,3,3-trifluoromethylpropyl) cyclotrisiloxane, hexamethylcyclotrisiloxane, hexaphenylcyclotrisiloxane, cis- or trans-2,4,6-trimethy;-2,4,6-triphenylcyclotrisiloxane, various isomers of trimethyltriethylcyclotrisiloxane, and the like.

The alkyl group in the alkyl lithium catalyst is generally monovalent hydrocarbon straight chain or branched, of 1 to 8 carbon atoms such as methyl, ethyl, propyl, heptyl, isooctyl, and the like; or cycloalkyl of 4 to 8 carbon atoms, such as cyclohexyl, cycloheptyl, and the like. These are commercially available or can be readily obtained by known methods. The preferred catalyst is butyl lithium.

Among the preferred aprotic solvents which may be employed in the practice of this invention are non-acid oxygen-containing and nitrogen-containing organic solvents capable of coordinating with the lithium. These include, for instance, tetrahydrofuran (hereinafter referred to as "THF"), tetrahydropyran, diethoxyethane, dimethyl ether of diethylene glycol, dimethyl acetamide, N-methyl pyrrolidone, dimethyl sulfoxide, dioxane, diethyl ether of diethylene glycol, various tertiary amines such as, for instance, dimethyl aniline, tributyl amine, pyridine, etc. Solvents which contain active hydrogen or an acid hydrogen should be avoided because of the reactivity of the lithium with the acidic hydrogen to produce new reaction centers and thereby causing a decrease in yield or an increase in the number of undesirable by products contrary to the intent of this invention. The preferred aprotic solvents are tetrahydrofuran, dimethyl sulfoxide, tetramethyl urea, hexamethylphosphoric triamide and dioxane.

It is also preferred that there be present less than 10 parts per million of water in the mixture of cyclic tetrasiloxanes (i) and cyclic siloxanes (ii), and the aprotic solvent (iv) which is to be utilized in copolymerization reaction. Removal of all but traces of water in the solvent is accomplished, e.g., by use of a molecular sieve, e.g., Linde 5A, and, from the cyclic co-monomers, water removal is accomplished by heating to 100°C. or above, with a nitrogen purge. This effectively reduces the water content of the cyclic siloxane mixture to less than 10 parts per million. It has been found that if there is substantially more than this amount of water present in the cyclic siloxanes, then the diorganopolysiloxane copolymer will not have the designed molecular weight.

To prepare the copolymers, the cyclic polysiloxanes, (i) and (ii), above, are placed in a vessel, along with solvent (iv).

Once the catalyst is added, copolymerization will begin. Specifically, there will be used 5 to 300 parts per million and, preferably, 10 to 100 parts per million, of the alkyl lithium catalyst. Preferably, the copolymerization will be carried out at a temperature of from 0° to 150°C. and more preferably, at a temperature of 50° to 100°C. If a temperature below 0° or above 150°C. is used, then the maxiumm yield of diorganopolysiloxane copolymer is not achieved and, below 0°C., the polymerization rate is somewhat too slow.

The mixed cyclic siloxane of Formulaes (i) and (ii) above, and the catalysts are heated or cooled to the indicated temperature range for from 5 minutes to 100 hours, preferably, 50 minutes to 10 hours, during which time copolymerization is completed. At this point, there will be 80 to 95% by weight or more of the cyclic siloxanes converted to the desired diorganopolysiloxane copolymer oil or gum. In this case, there will be 5 to 20% of the cyclic polysiloxanes of Formulae (i) and (ii) in the equilibrated mixture. At this point, the product can be recovered. For example, a few drops of acetic acid are added and the solvent is stripped.

In accordance with known techniques, the viscosity of the copolymer can be controlled by adding a chain-stopper, to the mixture of co-monomers (i) and (ii), catalyst (iii) and (iv). Such chain-stoppers can be, for example, disiloxanes or low molecular weight diorganopolysiloxanes having triorganosiloxy terminal units, that is, having monofunctional terminal units. The organo substituents in such chain-stoppers are typically alkyl of 1 to 8 carbon atoms, vinyl, phenyl or cycloalkyl of 4 to 8 carbon atoms. Also, they can comprise haloalkyl of from 1 to 8 carbon atoms, such as trifluoropropyl. As will be obvious, the amount of chain-stopper that is used in the mixture will be selected to produce the desired final molecular weight or viscosity of the diorganopolysiloxane copolymer oil or gum. Small amounts, e.g., 0.01 ml. of chainstopper per 100 ml. of mixed trimers will produce higher molecular weights, e.g., 100,000 centipoise at 25°C. The highest molecular weights will be obtained without chain-stoppers.

The process of this invention produces linear trifluoropropylorganopolysiloxane copolymer oils or gums. Obviously, the copolymer oils or gums can be formulated, e.g., by mixing with fillers, such as fumed silica or precipitated silica; extending fillers, such as zinc oxide, iron oxide, titanium oxide, diatomaceous earth, and the like; heat aging additives, such as iron oxide; pigments, and other additives, such as flame retardents, for instance, platinum, by itself, or in combination with other materials and self-bonding additives, such as for instance, triallylisocyanurate. The copolymer gums can be mixed into a uniform mass to which is added a curing agent, e.g., a peroxide curing agent, such as benzoyl peroxide or dicumyl peroxide. The resulting composition can be cured at elevated temperatures, e.g., from 100 to 300°C., or they can be cured by radiation to produce a silicone copolymer elastomer. The oils can be used as plasticizers, in greases, and as de-foamers.

DESCRIPTION OF THE PREFERRED EMBODIMENTS.

The following examples are for the purpose of illustrating the present invention. They are not to be construed to limit the invention in any manner whatsoever.

EXAMPLE 1

In a resin flask is placed 49.45 g. of a mixture of (i) 16.76 g. of 1,3,5-trimethyltris-1,3,5-(3,3,3-trifluoropropyl)-cyclotrisiloxane and (ii) 7.96 g. of trimethylcyclotrisiloxane, (i) being present in an amount of 50 mol % of the mixture of (i) and (ii), and 24.73 g. of dry tetrahydrofuran (iv). The flask is purged with dry nitrogen for 30 minutes to dry the mixtures of cyclic polysiloxanes to a level of less than 10 parts per million of water. The flask is heated to reflux in an oil bath and 10 microliters of butyl lithium in the form of a 15% solution in heptane, is added. The reaction is allowed to continue for 20 minutes and a gum is formed and stirring is stopped. At the end of 2 hours, the product is a firm gum. The product is taken up in 100 ml. of ethyl acetate and allowed to stand for 16 hours. An additional 80 ml. of ethyl acetate is added and the solution is run into 1600 ml. of methanol. The precipitated polymer is separated by decantation and air-dried for 16 hours. Final drying produces a copolymer having methyl,3,3,3-trifluoropropyl siloxane and dimethyl siloxane units, 23 g., 93% yield.

The following table compares the hydrocarbon swell of the above copolymer with a blend of pure fluorosilicone polymer and pure dimethylsiliconepolymer at the same fluorosilicone content.

| Fluorosilicone | Volume Swell (%) | |
|---|---|---|
| Copolymer (Example 1) | 50 mol % | 47 |
| Blend | 50 mol % | 66 |

The data clearly shows the advantage of a copolymer over a blend.

EXAMPLE 2

The procedure of Example 1 is repeated, using 40 mol % of (i) in the mixture of (i) and (ii). A high yield of oil resistant copolymer is obtained, after adding one drop of acetic acid and stripping of the solvent at 80°C. and 10 mm. of Hg. 1

EXAMPLE 3

The procedure of Example 2 is repeated, using 85 mol % of (i) in the mixture of (i) and (ii). A high yield of oil resistant copolymer is obtained.

The above detailed description is seen to provide a simple and straight-forward procedure for producing low molecular weight and high molecular weight diorganopolysiloxane copolymer oils and gums from trifluoropropyl cyclic trisiloxanes. The copolymer gums may be advantageously used to produce silicone elastomers having outstanding properties such as, for instance, increased resistance to degradation by oil, as compared to silicone elastomers formed from diorganopolysiloxane gums where the organo groups are mostly composed of low molecular weight and aromatic substituent groups such as methyl or vinyl. The oils are useful as plasticizers, grease components, and the like.

Many variations will suggest themselves to those skilled in the art in light of the above disclosure. All such obvious variations are within the full intended scope of the invention as defined by the appended claims.

We claim:
1. A process for producing diorganopolysiloxane copolymers having a viscosity of from 100,000 to 200,000,000 centipoise at 25°C. comprising (a) forming an admixture of
   i. a cyclic polysiloxane of the formula,

$(CF_3CH_2CH_2)(R)SiO)_3$ wherein R is methyl, ethyl, vinyl or phenyl,
   ii. a second cyclic polysiloxane of the formula, $(R_2SiO)_3$ wherein R is, independently, as defined above, (i) being present in an amount of from 40 to 85 mol % of the total of (i) and (ii), (iii) is from 5 to 300 parts per million of an alkyl lithium catalyst, the alkyl compound containing from 1 to 12 carbon atoms, and (iv) an aprotic solvent, said aprotic solvent being capable of dissolving both of the trimers (i) and (ii) and the copolymer product; (b) reacting said admixture at a temperature between 0°C. and 150°C. to form said copolymer; and (c) recovering said copolymer from the reaction mixture.
2. A process as defined in claim 1 wherein, in said cyclic polysiloxanes (i) and (ii), R is $CH_3$.
3. A process as defined in claim 1 wherein said alkyl lithium catalyst is butyl lithium.
4. A process as defined in claim 1 wherein said aprotic solvent is selected from tetrahydrofuran, dimethyl sulfoxide, tetramethylurea, hexamethylphosphoric triamide, or dioxane.
5. A process as defined in claim 1 wherein, in the admixture, cyclic polysiloxane (i) comprises from 50 to 75 mol % of the total of (i) and (ii).
6. A process as defined in claim 1 wherein in cyclic polysiloxanes (i) and (ii), R is $CH_3$; said alkyl lithium catalyst is butyl lithium, and said aprotic solvent is tetrahydrofuran.
7. A process as defined in claim 1 wherein the copolymer is recovered by distilling off the solvent.
8. A process as defined in claim 7 wherein the solvent is stripped at a temperature of from 50 to 200°C. and at a pressure in the range of from 1 to 100 mm. of Hg.

* * * * *